June 26, 1962 W. F. BARTLETT ETAL 3,041,401

COMMUNICATION SYSTEM ENERGY TRANSFER CIRCUIT

Filed Sept. 21, 1959 2 Sheets-Sheet 1

INVENTORS.
WILLIAM F. BARTLETT
RICHARD SCOTT

BY F. H. Henson

ATTORNEY

COMMUNICATION SYSTEM ENERGY TRANSFER CIRCUIT

Filed Sept. 21, 1959

BLOCKING OSCILLATOR GATE - BOG

LOW PASS FILTER-FLN 3,041,401
Patented June 26, 1962

3,041,401

COMMUNICATION SYSTEM ENERGY TRANSFER CIRCUIT

William F. Bartlett and Richard Scott, Rochester, N.Y., assignors to General Dynamics Corporation, Rochester, N.Y., a corporation of Delaware Filed Sept. 21, 1959, Ser. No. 841,176
7 Claims. (Cl. 179—15)

Figure 1:
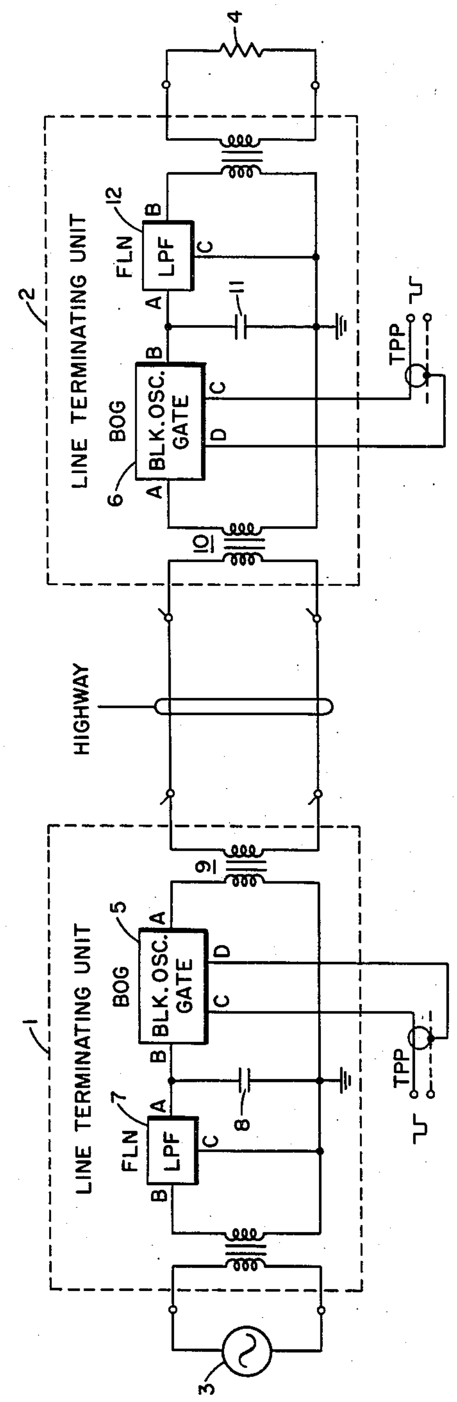

The present invention relates in general to communication systems and, more particularly, to circuits for storing and transferring information energy in communication systems.

Although the present invention has many applications, it is particularly adapted for use in the voice path of a time division multiplex communication system of the type shown and described in copending application Serial Number 814,926, filed May 21, 1959, and assigned to the same assignee as the present invention. In the system disclosed in the above-identified application, the lines of the system are interconnected by a transmission network, or highway, of the time division channel type and each line is permanently assigned an individual one of the time position channels. Connections are completed between calling and called lines by link connectors common to the lines of the system and which each have calling and called gates for controlling the connection of that link connector to the time position channels assigned to the calling and called lines, respectively. That is, speech signal samples received from the calling and called lines by a link connector are demodulated and retransmitted in the time positions of the called and calling lines, respectively, to the called and calling lines. Link connectors are used in the system of the above-identified application since the transmission network is of the four-wire type and a cross-over must be made to achieve the connection of the transmitting section of the calling line terminating unit to the receiving section of the called line terminating unit and the connection of the transmitting section of the called line terminating unit to the receiving section of the calling line terminating unit.

In the above-identified application, the transfer of information from the lines to the link connectors and from the link connectors to the lines is of the resonant transfer type. A series resonant circuit is completed between a capacitor and an inductor forming the end elements of a low-pass filter in the line terminating unit and a capacitor and an inductor forming the end elements of a low-pass filter in the link connector when the gate which connects the line terminating unit to the network and the gate which connects the link connector to the network are simultaneously operated.

A disadvantage of the above-described type of resonant transfer is that the number of channels on a highway is restricted because of impedance considerations. The impedance level, or, the ratio of voltage to current in the terminating units, is restricted by the current and voltage handling capabilities of the switches or gates which connect the units to the transmission network. For a given sampling rate or pulse frame time T, if the impedance level is raised, the peak audio voltage increases and the peak current decreases. Similarly, if the impedance level and the sampling rate are maintained constant and the number of time position channels is increased, the peak transfer current, of course, is increased. Thus, the capabilities of the gate determine whether a high impedance level, a high voltage, and low current or a low impedance level, low voltage, and high transfer current is used. The sampling rate and the impedance level determine the design characteristics of the low-pass filter and inasmuch as the transfer capacitor forms an end element of the filter, its value is fixed. The value of the transfer inductor is then chosen so that when two terminating units are connected together, a series resonant circuit is completed having a resonant frequency of $$\frac{1}{2t}$$

where $t$ is equal to the pulse width.

If the number of channels on the network is increased and the pulse width is thus decreased while the impedance level and sampling rate are maintained constant, it becomes necessary to reduce the inductance of the resonant circuit inductor to obtain the required resonant frequency. When the inductance of the resonant circuit inductor is reduced to the point where it becomes comparable in value to the inductance of the transmission network, further decreases are without effect.

Also, because of crosstalk between transmission networks or between a transmission network and other A.-C. signal carrying conductors, it is desirable that the transmission network which interconnects the line terminating units, as described above, be balanced. This is impossible in the above-described type of resonant transfer without employing duplicate equipment in each side of the line.

Accordingly, it is the general object of this invention to provide a new and improved energy transfer circuit.

It is a further object of this invention to provide a new and improved communication system of the time division channel type.

It is a more particular object of this invention to provide a new and improved energy transfer circuit of the resonant transfer type for use in the voice path of a communication system, which circuit employs the use of a relatively simple electronic switch to connect a line to a balanced transmission network, and which permits the use of a large number of channels on a transmission network.

Briefly, the present invention accomplishes the above cited objects by providing transformer coupling between the transmitting low-pass filter and capacitor and the transmission network and transformer coupling between the transmission network and the receiving low-pass filter and capacitor in a resonant transfer communication system. In accordance with the present invention, a source of voice frequency signals, which may be a telephone transmitter, is coupled to a first capacitor through a first low-pass filter, a first gate is interposed in a connection between the first filter and the primary winding of a first transformer, the secondary windings of the first transformer and a second transformer are interconnected by a balanced transmission network, a second gate is interposed in a connection between the primary winding of the second transformer and a second capacitor, the second capacitor is coupled to the load, which may be a telephone receiver, through a second low-pass filter, and the first and second gates are periodically synchronously operated for a period of time substantially equal to an odd number of half cycles, preferably one-half cycle, of the resonant frequency of the circuit including the first and second capacitors and completed through the first and second transformers. Thus, because of the transformer coupling, the turns ratio of the transformers may be adjusted to achieve impedance matching between the circuits terminating the transmission network and the transmission network as the number of channels on a network is increased, and simple switches may be used with a balanced transmission network.

Further objects and advantages of the invention will become apparent as the following description proceeds, and features of novelty which characterize the invention will be pointed out in particularity in the claims annexed to and forming a part of this specification.

For a better understanding of the invention, reference may be had to the accompanying drawings which comprise six figures on two sheets.

Figure 2:
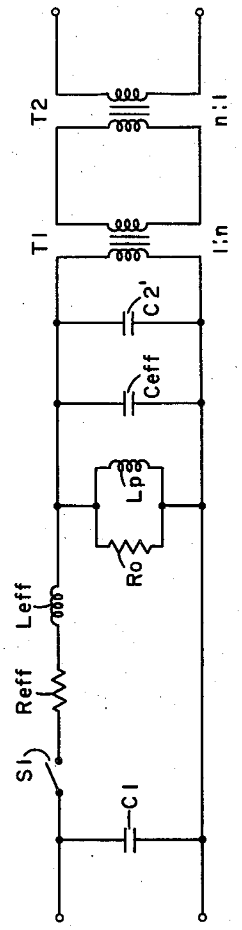
Figure 3:
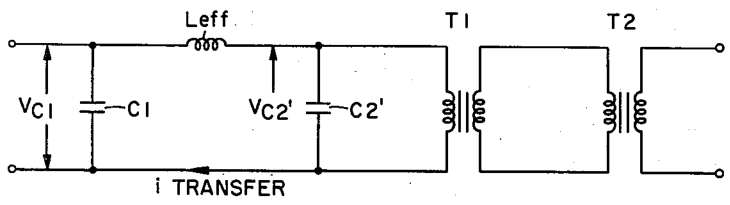
Figure 4:
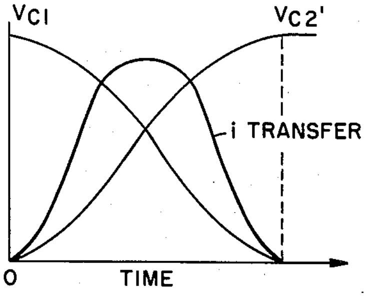

FIG. 1 shows in logic schematic form the voice path of a communication system incorporating the present invention, FIG. 2 shows the equivalent circuit of the resonant transfer circuit of FIG. 1, FIG. 3 shows a simplified equivalent circuit of the resonant transfer circuit of FIG. 1, FIG. 4 is a graphic illustration of the resonant transfer operation, and FIGS. 5 and 6 show the logic symbols, together with a typical circuit represented by each symbol, which are used in the circuit drawing of FIG. 1.

Since the resonant transfer circuit herein disclosed is bilateral in operation, it has been illustrated as embodied in a two-wire transmission system. That is, even though signal generator 3, which may be a telephone transmitter, is shown connected to the line terminated by line terminating unit 1 and load 4, which may be a telephone receiver, is shown connected to the line terminated by line terminating unit 2, it is to be understood that generator 3 and load 4 are merely transposed for the opposite direction of transmission. As shown, the line terminating units are interconnected by a two-conductor balanced transmission network. In the system disclosed in the above-identified application Serial Number 814,926, the transmission network or highway comprises thirty-two time division channels, the master oscillator or clock source has a frequency of 400 kc., each channel is 1.25 microseconds in width, and there is a guard time of 1.25 microseconds between channels so that each pulse frame is 80 microseconds in duration, and each line is scanned at a frequency of 12.5 kc. Thus, assuming that a call is in progress between the line terminated by unit 1 and the line terminated by unit 2, that an idle channel on said network has been assigned to the call, and that time position identifying pulses in the time position of that channel are applied to conductors TPP, all in the same manner as fully described in copending application Serial Number 721,241, filed March 13, 1958, and assigned to the same assignee as the present invention, blocking oscillator gates 5 and 6 are simultaneously closed or operated during the time position assigned to the call for approximately 1.25 microseconds in each 80 microsecond frame period.

During each 78.75 microsecond period while blocking oscillator gate 5 is open or unoperated, voice frequency signals received from signal source 3 are coupled through low-pass filter 7 and capacitor 8, which is connected across the output terminals of low-pass filter 7, is charged in accordance with the amplitude of said signals. During the time position assigned to the call, blocking oscillator gates 5 and 6 are closed or operated, as previously explained, and the energy stored in capacitor 8 is coupled through the windings of transformers 9 and 10 to charge capacitor 11. During the sampling period, all of the energy stored in capacitor 8 is transferred to capacitor 11 by resonating capacitor 8 and capacitor 11 with the transformer inductances at a frequency of $$f=\frac{1}{2t}$$

where $t$ is the sampling period, as previously explained. The resonant circuit voltages and current during transfer are graphically illustrated in FIG. 4. Restated, since the time that gates 5 and 6 are closed is equal to one-half cycle of the resonant frequency of the circuit including capacitors 8 and 11 and completed through transformers 9 and 10, all of the energy stored in capacitor 8 is transferred to capacitor 11. Theoretically, the gates could be closed for any number of odd half cycles but any number of odd half cycles other than one would be impractical since the energy is subject to loss on each transfer from capacitor 8 to capacitor 11 and from capacitor 11 to capacitor 8. During the next succeeding 78.75 microsecond interval while blocking oscillator gate 6 is open, the energy stored in capacitor 11 is transferred to load 4 through low-pass filter 12 so that the charge on capacitor 11 is zero when gate 6 is again closed. The opposite direction of transmission is accomplished in exactly the same manner.

The transfer circuit equivalent circuit is shown in FIG. 2. By suitable transformer design, it is arranged that the effective elements are capacitor C1 and capacitor C2′, which correspond to capacitors 8 and 11, respectively, of FIG. 1, and the leakage inductance $L_{eff}$ of the two transformers T1 and T2, which correspond to transformers 9 and 10, respectively, of FIG. 1. Therefore, the resonant frequency of the circuit formed when switch S1 is closed including capacitor C1, inductance $L_{eff}$, and capacitor C2′ is essentially $$f=\frac{1}{2\pi\sqrt{L_{eff}\frac{C1C2'}{C1+C2'}}}$$

As the principle of operation of the system is based on resonating capacitors C1 and C2′ with the combined leakage inductances $L_{eff}$, the transfer circuit equivalent circuit will be described in more detail. $L_P$ is the magnetizing inductance of both transformers, $C_{eff}$ is the primary and secondary self-capacitance of both transformers, $R_0$ represents eddy current and hysteresis loss of both transformers, $R_{eff}$ is the resistance of the primary and secondary windings of both transformers, $L_{eff}$ represents the leakage inductance of both transformers, and C2′ represents the capacitance of the receiving capacitor, all referenced to the primary side of transformer T1. $L_P$, $C_{eff}$, $R_0$, and $R_{eff}$ introduce loss into the system but by suitable transformer design the effect of these elements is reduced to a minimum. FIG. 3 shows the equivalent circuit of the transfer circuit with the loss producing elements removed and the operation of said circuit is graphically illustrated in FIG. 4.

Figure 5A:
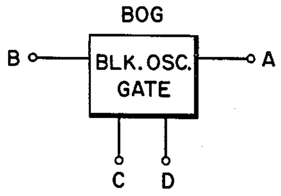
Figure 5B:
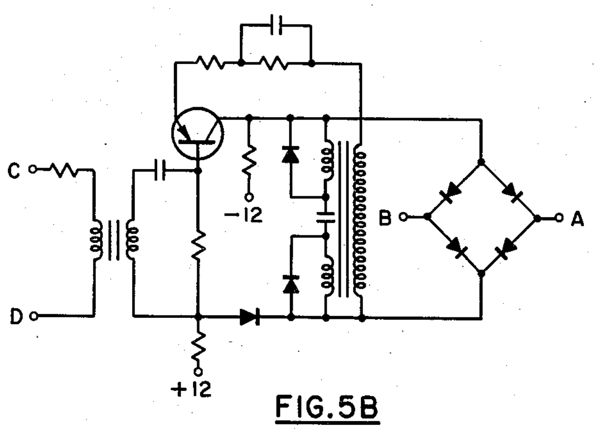

The logic symbol for blocking oscillator gate BOG, which is suitable for use as the electronic switch of FIG. 1, is shown in FIG. 5A and a typical circuit represented by said symbol is shown in FIG. 5B. The illustrated circuit comprises a diode bridge in which the individual diodes of the bridge are normally biased in the reverse direction so as to present a very high impedance and thus prevent the transfer of energy between terminals B and A. The bridge diodes are biased in the forward direction to present a very low impedance and thus permit the transfer of energy between terminals B and A only when the blocking oscillator transistor is conductive. As used in the illustrated system, the blocking oscillator transistor is triggered into conduction by the leading edge of a time position defining pulse applied across terminals C and D and the time constant of the circuit is such that the transistor is conductive and the bridge diodes are biased in the forward direction for 1.25 microseconds regardless of the duration of the input pulse.

Figure 6A:
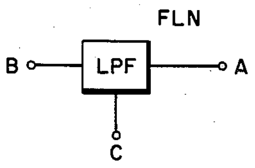
Figure 6B:
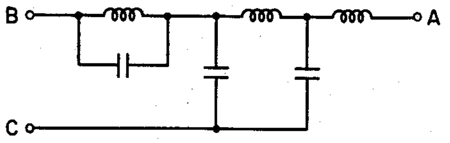

The logic symbol for low-pass filter FLN is shown in FIG. 6A and a typical circuit represented by said symbol is shown in FIG. 6B. The conventionally designed low-pass filter has a nominal cutoff at 6 kc., is driven by a 6000 ohm generator, and works into an open circuit load. The insertion loss of the filter is 1 db maximum up to 4 kc.

While there has been shown and described what is considered at present to be the preferred embodiment of the invention, modifications thereto will readily occur to those skilled in the art. It is intended, therefore, to cover in the appended claims all such modifications as fall within the true spirit and scope of the invention.

What is claimed is:

1. An energy transfer circuit comprising first and second capacitors, first and second transformers each having a primary and a secondary winding, means for interconnecting the secondary windings of said first and second transformers, means for connecting said second capacitor across the primary winding of said second transformer, means for storing energy in said first capacitor, and means for periodically completing a connection between said first capacitor and the primary winding of said first transformer for a period of time substantially equal to an odd number of half cycles of the resonant frequency of the circuit including said first and second capacitors and completed through said first and second transformers.

2. In combination, a source of signals, a load, first and second capacitors, first and second transformers each having a primary and a secondary winding, means for coupling said source of signals to said first capacitor, means for interconnecting the secondary windings of said first and second transformers, means for coupling said second capacitor to said load, and means for periodically connecting said first and second capacitors across the primary windings of said first and second transformers, respectively, for a period of time substantially equal to an odd number of half cycles of the resonant frequency of the circuit including said first and second capacitors and completed through said first and second transformers.

3. An energy transfer circuit comprising first and second capacitors, first and second transformers each having a primary winding and a secondary winding, a switch, means for connecting one terminal of said first capacitor to one terminal of the primary winding of said first transformer, means for interposing said switch in a connection between the other terminal of said first capacitor and the other terminal of the primary winding of said first transformer, means for interconnecting the secondary windings of said first and second transformers, means for connecting said second capacitor across the primary winding of said second transformer, means for storing energy in said first capacitor, and means for periodically closing said switch for a period of time substantially equal to an odd number of half cycles of the resonant frequency of the circuit including said first and second capacitors and completed through said first and second transformers.

4. An energy transfer circuit comprising first and second capacitors, first and second transformers each having a primary winding and a secondary winding, first and second switches, means for connecting one terminal of said first capacitor to one terminal of the primary winding of said first transformer, means for interposing said first switch in a connection between the other terminal of said first capacitor and the other terminal of the primary winding of said first transformer, means for interconnecting the secondary windings of said first and second transformers, means for connecting one terminal of said second capacitor to one terminal of the primary winding of said second transformer, means for interposing said second switch in a connection between the other terminal of said second capacitor and the other terminal of the primary winding of said second transformer, means for storing energy in said first capacitor, and means for periodically synchronously closing said switches for a period of time substantially equal to an odd number of half cycles of the resonant frequency of the circuit including said first and second capacitors and completed through said first and second transformers.

5. In combination, a source of signals, a load, first and second capacitors, first and second transformers each having a primary and a secondary winding, means for coupling said source of signals to said first capacitor, means for interconnecting the secondary windings of said first and second transformers, means for coupling said second capacitor to said load, a first switch operative to connect said first capacitor across the primary winding of said first transformer, a second switch operative to connect said second capacitor across the primary winding of said second transformer, and means for periodically synchronously operating said switches for a period of time substantially equal to an odd number of half cycles of the resonant frequency of the circuit including said first and second capacitors and completed through said first and second transformers.

6. In a communication system, a source of voice frequency signals, a load, first and second circuits, said first circuit comprising a first low-pass filter having a cutoff frequency N, a first capacitor, a first transformer having a primary and a secondary winding, and a first gate operative to connect said first capacitor across the primary winding of said first transformer, said second circuit comprising a second low-pass filter having a cutoff frequency N, a second capacitor, a second transformer having a primary and a secondary winding, and a second gate operative to connect said second capacitor across the primary winding of said second transformer, means for coupling said source of signals to said first capacitor through said first filter, means for coupling said second capacitor to said load through said second filter, a transmission highway network interconnecting the secondary windings of said first and second transformers, means for assigning a time position which recurs at a frequency greater than 2N in repetitive time position frames to said first and second circuits, and means for operating said first and second gates during the time position assigned to said first and second circuits for a period of time substantially equal to an odd number of half cycles of the resonant frequency of the circuit including said first and second capacitors and completed through said first and second transformers.

7. In a communication system, a source of voice frequency signals, a load, first and second circuits, said first circuit comprising a first low-pass filter having input and output terminals and a cutoff frequency N, a first capacitor, a first gate, and a first transformer having a primary and a secondary winding, said second circuit comprising a second low-pass filter having input and output terminals and a cutoff frequency N, a second capacitor, a second gate, and a second transformer having a primary and a secondary winding, means for coupling said source of signals to the input terminals of said first filter, means for connecting said first capacitor across the output terminals of said first filter, means for interposing said first gate in a connection between the output terminals of said first filter and the primary winding of said first transformer, a transmission highway network interconnecting the secondary windings of said first and second transformers, means for interposing said second gate in a connection between the primary winding of said second transformer and the input terminals of said second filter, means for connecting said second capacitor across the input terminals of said second filter, means for assigning a time position which recurs at a frequency greater than 2N in repetitive time position frames to said first and second circuits, and means for closing said first and second gates during the time position assigned to said first and second circuits for a period of time substantially equal to an odd number of half cycles of the resonant frequency of the circuit including said first and second capacitors and completed through said first and second transformers.

References Cited in the file of this patent

UNITED STATES PATENTS

| | | |
|---|---|---|
| 2,626,987 | Veaux | Jan. 27, 1953 |
| 2,851,532 | Crosby | Sept. 9, 1958 |
| 2,870,259 | Norris | Jan. 20, 1959 |